US012396440B2

(12) United States Patent
Nishiyama et al.

(10) Patent No.: US 12,396,440 B2
(45) Date of Patent: Aug. 26, 2025

(54) INFORMATION PROCESSING APPARATUS FOR ASSESSING ANIMAL CONDIDTION IN VEHICLE

(71) Applicant: SUBARU CORPORATION, Tokyo (JP)

(72) Inventors: Yoshikatsu Nishiyama, Tokyo (JP); Takuya Ueda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 125 days.

(21) Appl. No.: 18/451,317

(22) Filed: Aug. 17, 2023

(65) Prior Publication Data

US 2024/0090476 A1 Mar. 21, 2024

(30) Foreign Application Priority Data

Sep. 20, 2022 (JP) ................. 2022-149430

(51) Int. Cl.
*A01K 29/00* (2006.01)
*G01H 17/00* (2006.01)
(52) U.S. Cl.
CPC .......... *A01K 29/005* (2013.01); *G01H 17/00* (2013.01)
(58) Field of Classification Search
CPC .............. A01K 20/005; G01H 17/00
See application file for complete search history.

(56) References Cited

U.S. PATENT DOCUMENTS

| 10,543,758 | B2* | 1/2020 | Hardee | B60N 2/0273 |
| 10,926,773 | B2* | 2/2021 | Vulcu | A61B 5/6893 |
| 11,529,090 | B2* | 12/2022 | Bulut | A61B 5/02416 |
| 12,053,426 | B2* | 8/2024 | Owen | A61H 23/0245 |
| 2007/0198183 | A1* | 8/2007 | Morimoto | G01C 21/3697 701/431 |
| 2014/0176296 | A1* | 6/2014 | Morgan | G06F 3/011 340/4.13 |
| 2019/0133511 | A1* | 5/2019 | Migneco | A61B 5/4076 |

FOREIGN PATENT DOCUMENTS

JP 2020-29210 A 2/2020

* cited by examiner

*Primary Examiner* — John A Tweel, Jr.
(74) *Attorney, Agent, or Firm* — Rimon P.C.

(57) ABSTRACT

An information processing apparatus configured to determine a condition of an animal that is other than a human and moving on a mobile body. The information processing apparatus includes one or more processors and one or more memories communicatively coupled to the one or more processors. The one or more processors are configured to execute: obtaining a first vibration detection result indicating vibration of the animal and a second vibration detection result indicating vibration in a surrounding environment of the animal; and determining the condition of the animal based on the first vibration detection result, the second vibration detection result, and a vibration pattern that is accumulated in a database.

5 Claims, 5 Drawing Sheets

CASE OF DIFFERENT AMPLITUDES

CASE OF DIFFERENT ATTENUATION RATIOS

CASE OF DIFFERENT FREQUENCIES

CASE OF DIFFERENT VIBRATION DURATIONS

CASE OF DIFFERENT VIBRATION TIME INTERVALS

CASE OF COMPOSITE DIFFERENCES

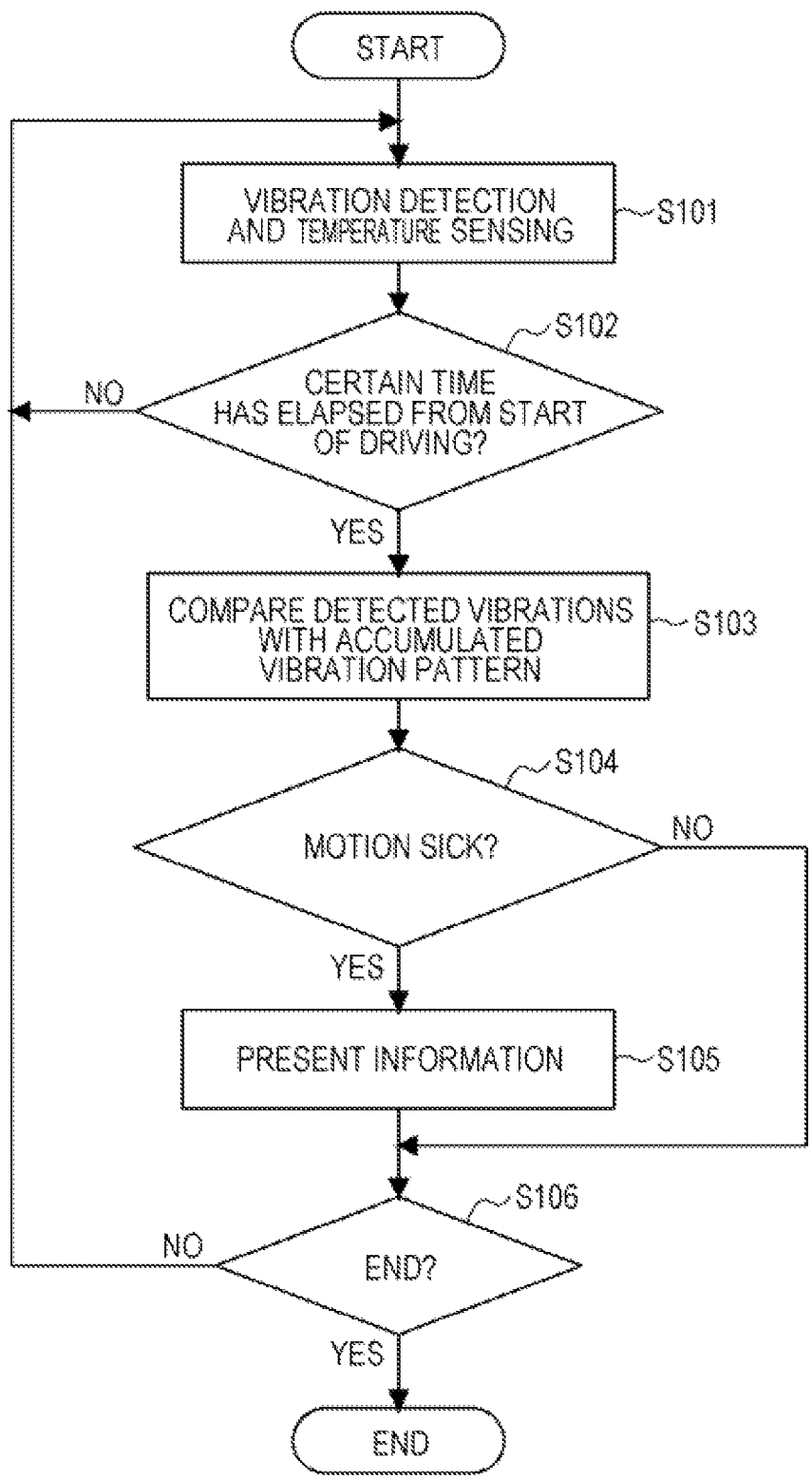

INFORMATION PROCESSING APPARATUS FOR ASSESSING ANIMAL CONDIDTION IN VEHICLE

CROSS-REFERENCE TO RELATED APPLICATIONS

The present application claims priority from Japanese Patent Application No. 2022-149430 filed on Sep. 20, 2022, the entire contents of which are hereby incorporated by reference.

BACKGROUND

The disclosure relates to an information processing apparatus and a vehicle.

There has been increasing attention in recent years to the comfort of vehicles, and it is believed that vehicles that are comfortable not only for people but also for pets are demanded. Because pets are unable to speak, there are few indicators to measure their physical conditions. With respect to that, Japanese Unexamined Patent Application Publication (JP-A) No. 2020-29210 discloses technology for determining carsickness of occupants and pets based on biological signals including at least vital signs such as blood pressure, pulse rate, body temperature, and perspiration, reflexes such as chemical reflexes, physical reflexes, and electrical reflexes, or voluntary movements.

SUMMARY

An aspect of the disclosure provides an information processing apparatus configured to determine a condition of an animal that is other than a human and moving on a mobile body. The apparatus includes one or more processors and one or more memories communicatively coupled to the one or more processors. The one or more processors are configured to execute: obtaining a first vibration detection result indicating vibration of the animal and a second vibration detection result indicating vibration in a surrounding environment of the animal; and determining the condition of the animal based on the first detection result, the second vibration detection result, and a vibration pattern accumulated that is in a database.

An aspect of the disclosure provides a vehicle. The vehicle includes a first sensor, a second sensor, and an information presentation device. The first sensor is configured to perform detection of vibration of an animal that is other than a human and moving on a mobile body. The second sensor is configured to perform detection of vibration in a surrounding environment of the animal. The information presentation device is configured to present information for improving a condition of the animal in accordance with the condition determined based on a result of the first detection by the first sensor, a result of the second detection by the second sensor, and a vibration pattern that is accumulated in a database.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 10 is a flowchart illustrating an example of a process in the embodiment of the disclosure.

DETAILED DESCRIPTION

The technology described in JP-A No. 2020-29210 is for determining the carsickness of pets as well as occupants based on biological signals. While occupants are seated in their seats with their postures being stable, animals are not always in such a state, and it is believed that carsickness cannot always be determined accurately in the same way as for occupants.

The disclosure provides an information processing apparatus capable of more accurately determining motion sickness in animals other than occupants on a mobile vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
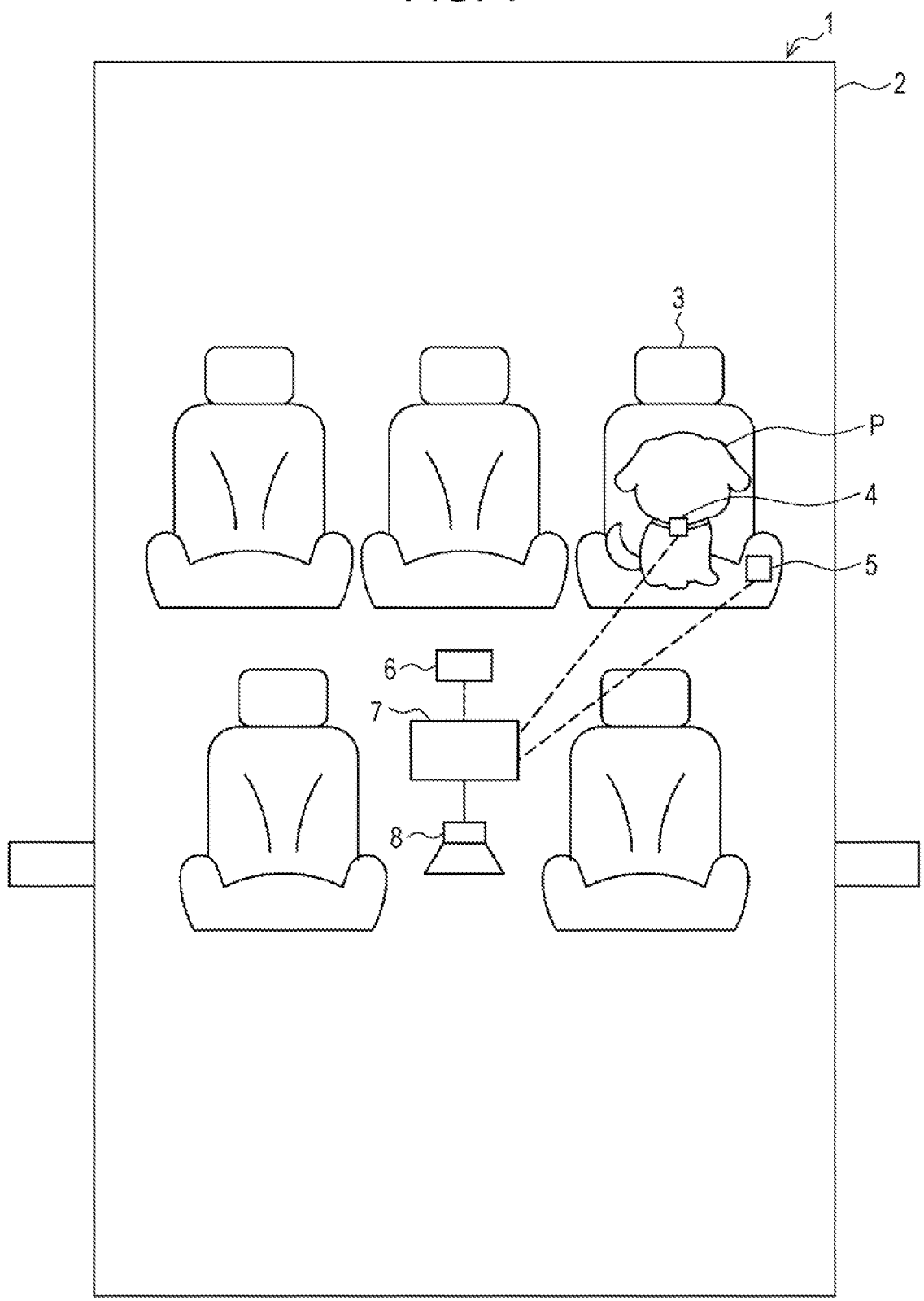
FIG. 1 is a diagram schematically illustrating the configuration of a vehicle according to an embodiment of the disclosure.

1. Example of Configuration of Vehicle to Which Information Processing Apparatus is Applied The present embodiment describes an example in which the technology of the disclosure is applied to a vehicle as an aspect of a mobile vehicle. FIG. 1 is a diagram schematically illustrating the configuration of a vehicle according to the embodiment of the disclosure. In the illustrated example, a vehicle 1 includes a vehicle body 2, seats 3, accelerometers 4 and 5, a thermometer 6, an information processing apparatus 7, and a speaker 8.

For components of the vehicle 1 other than those described above, including the drive system, technology of the related art can be appropriately utilized, and thus illustrations and descriptions thereof will be omitted. In addition, for configurations of the vehicle 1, the vehicle body 2, and the seats 3 other than those described in relation to the present embodiment, technology of the related art can be appropriately utilized, and thus descriptions thereof will be omitted.

The accelerometer 4 is an example of a sensor configured to detect the vibration of a non-human animal, which is, for example, a pet P, in the vehicle 1. The accelerometer 4 is attached to, for example, the collar of the pet P such as a dog. For example, by extracting an appropriate frequency band from the measured value of the accelerometer 4, vibration generated on the body of the pet P due to the driving of the vehicle 1 can be detected, excluding changes in acceleration caused by the voluntary movements of the pet P.

Note that the sensor configured to detect the vibration of the pet P is not limited to an accelerometer, and the vibration of the pet P may be detected, for example, by analyzing an image of the pet P captured by a camera.

The accelerometer 5 is an example of a sensor configured to detect vibration in the surrounding environment of the pet P, which is, for example, the interior of the vehicle body 2 (in the compartment). The accelerometer 5 is attached to, for example, the interior of one of the seats 3. In another example, the accelerometer 5 may be attached to a position other than the seats 3 in the compartment. Alternatively, the accelerometer 5 may be attached to an object that is not part of the vehicle 1, such as a cushion on which the pet P is placed. For example, by extracting an appropriate frequency band from the measured value of the accelerometer 5, vibration generated in the surrounding environment of the pet P due to the driving of the vehicle 1 can be detected, excluding changes in acceleration caused by the voluntary movements of other occupants.

The thermometer 6 is an example of a sensor configured to detect the temperature in the surrounding environment of the pet P, which is, for example, the temperature in the compartment. The thermometer 6 may be, for example, one configured to measure the temperature in the vicinity using a thermistor, or one may be configured to measure the temperature distribution in a certain region, like a radiation thermometer or an infrared camera. The thermometer 6 may detect the temperature in the vicinity of the pet P, or detect the average temperature in the compartment. As will be described later, instead of or along with the thermometer 6, an illuminance meter configured to detect the illuminance in the compartment and/or a gas sensor configured to detect the $CO_2$ concentration in the compartment may be installed.

The information processing apparatus 7 determines the condition of the pet P based on the measured values of the accelerometers 4 and 5 and the thermometer 6, and presents information to the driver or other occupants via the speaker 8 according to the determination result. The information processing apparatus 7 includes one or more processors such as central processing units (CPUs), and one or more memories. The processor(s) performs a process as described below by operating in accordance with a computer program. The computer program may be recorded in a recording medium that functions as a storage unit (memory) provided in the information processing apparatus 7, or may be recorded in a recording medium embedded in the information processing apparatus 7 or in any recording medium that can be externally attached to the information processing apparatus 7.

The recording medium for recording the computer program may be a magnetic medium such as a hard disk, a floppy disk, and a magnetic tape, an optical recording medium such as a compact-disc read-only memory (CD-ROM), a digital versatile disc (DVD), and a Blu-ray Disc (trademark), a magneto-optical medium such as a floptical disk, a storage element such as a random-access memory (RAM) and a ROM, a flash memory such as a Universal Serial Bus (USB) memory and a solid state drive (SSD), and any other medium capable of storing the program.

Note that the information processing apparatus 7 is not limited to an electronic control apparatus installed in the vehicle 1, and may be a terminal apparatus such as a smartphone, a wearable device, or the like. Moreover, although all of the functions of the information processing apparatus 7 are mounted on the vehicle 1 in the above-describe embodiment, the technology of the disclosure is not limited to such examples. Some or all of the functions of the information processing apparatus 7 may be configured by an external server that is communicatively coupled to the vehicle 1.

The measured values of the accelerometers 4 and 5 and the thermometer 6 are transmitted to the information processing apparatus 7 by communication means according to the implementation of the information processing apparatus 7 as described above. For example, if the information processing apparatus 7 is an electronic control apparatus installed in the vehicle 1, the measured values may be transmitted to the information processing apparatus 7 via a wired communication interface. Alternatively, if the information processing apparatus 7 is a terminal apparatus such as a smartphone or a wearable device, the measured values may be transmitted to the information processing apparatus 7 via a wireless communication interface such as Bluetooth (registered trademark). If some or all of the functions of the information processing apparatus 7 are configured by an external server, the measured values may be transmitted to the information processing apparatus 7 via network communication, for example.

2. Example of Configuration of Information Processing Apparatus

Figure 2:
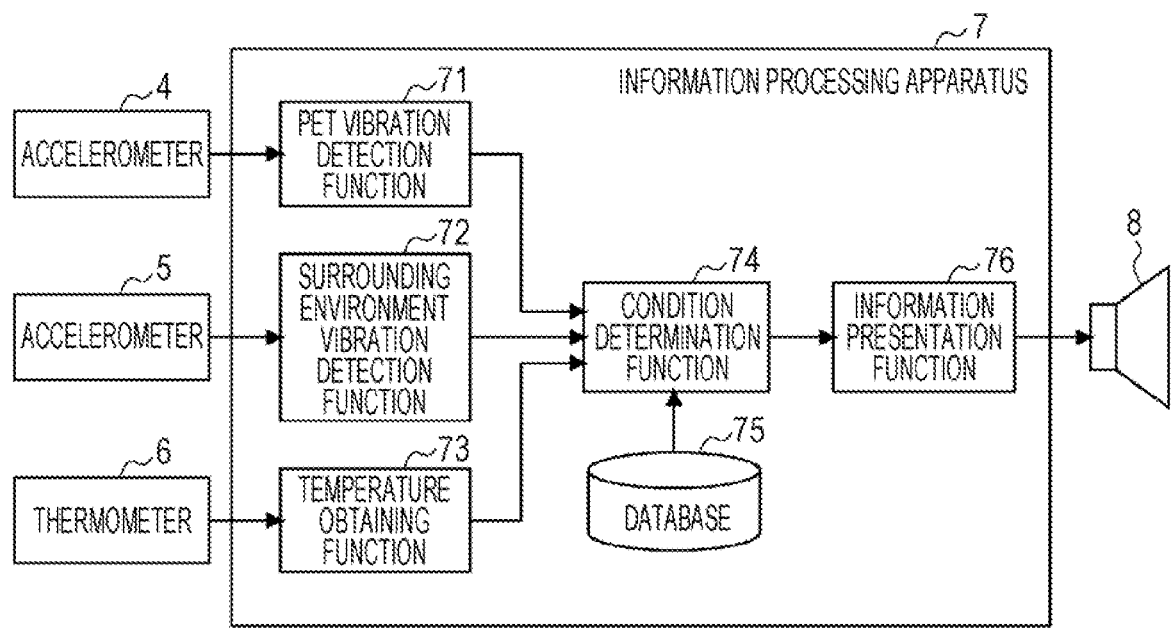
FIG. 2 is a block diagram illustrating an example of the functional configuration of an information processing apparatus in the example illustrated in FIG. 1.

FIG. 2 is a block diagram illustrating an example of the functional configuration of the information processing apparatus in the example illustrated in FIG. 1. The functional parts described below are realized by the processor(s) of the information processing apparatus 7 operating according to the computer program as described above. In the illustrated example, the information processing apparatus 7 includes a pet vibration detection function 71, a surrounding environment vibration detection function 72, a temperature obtaining function 73, a condition determination function 74, and an information presentation function 76. Each of the functions will be further described below.

Although the pet vibration detection function 71 and the surrounding environment vibration detection function 72 are described as functions for performing vibration detection by themselves based on the measured values of the accelerometers and obtaining the results, in other embodiments, the accelerometers 4 and 5 or other external devices may perform detecting the vibration from the measured values, and the information processing apparatus 7 may just perform obtaining the vibration detection results output from those devices.

The pet vibration detection function 71 detects the vibration of the pet P based on the measured value of the accelerometer 4 attached to the pet P. For example, the pet vibration detection function 71 analyzes the measured value of the accelerometer 4 using frequency filtering, a fast Fourier transform (FFT), etc. to obtain a vibration detection result indicating one or more of the amplitude, attenuation ratio, frequency, duration, and time interval of the vibration of the pet P (hereinafter also referred to as a first vibration detection result).

The surrounding environment vibration detection function 72 detects vibration in the surrounding environment of the pet P based on the measured value of the accelerometer 5 disposed in the compartment. For example, the surrounding environment vibration detection function 72 analyzes the measured value of the accelerometer 5 using frequency filtering, FFT, etc. to obtain a vibration detection result indicating one or more of the amplitude, attenuation ratio, frequency, duration, and time interval of the vibration of the pet P (hereinafter also referred to as a second vibration detection result).

The temperature obtaining function 73 obtains the temperature in the surrounding environment of the pet P based on the measured value of the thermometer 6 disposed in the compartment. The temperature obtaining function 73 may provide the obtained measured value of the thermometer 6 as-is to the condition determination function 74, or may calculate an average value when the thermometer 6 detects the temperature distribution or smooth the measured values of the thermometer 6 in time series. As described above, instead of or along with the thermometer 6, when an illuminance meter configured to detect the illuminance in the compartment and/or a gas sensor configured to detect the $CO_2$ concentration in the compartment is installed, the function of obtaining measured values corresponding to these sensors is implemented by the information processing apparatus 7.

The condition determination function 74 determines the condition of the pet P based on the vibration detection results obtained by the pet vibration detection function 71 and the surrounding environment vibration detection function 72 and a vibration pattern accumulated in a database 75. In the present embodiment, while referring also to the second vibration detection result obtained by the surrounding environment vibration detection function 72 as described below, the condition determination function 74 compares the first vibration detection result obtained by the pet vibration detection function 71 with the vibration pattern, and, when the first vibration detection result deviates from the vibration pattern, determines that the condition of the pet P is a condition to be improved, which is, for example, a condition where the pet P is experiencing motion sickness. For example, the condition determination function 74 determines whether the pet P is experiencing motion sickness, and if so, the degree thereof.

It is believed that pets experience motion sickness because unusual vibrations are added to them due to the driving of the vehicle. In the present embodiment, vibration when the pet P is not experiencing motion sickness is detected, and its characteristics are accumulated as a vibration pattern in the database 75. When a newly detected vibration of the pet P deviates from the vibration pattern, it is determined that the pet P is experiencing motion sickness. In the meantime, whether the pet P is experiencing motion sickness is also affected by vibration generated in the compartment due to the driving of the vehicle 1, and, when making the determination described above, the accuracy of the determination is improved by taking into consideration the vibration in the compartment.

Accordingly, in the present embodiment, in addition to the first vibration detection result obtained by the pet vibration detection function 71 and the vibration pattern accumulated in the database 75, the condition of the pet P is determined also based on the second vibration detection result obtained by the surrounding environment vibration detection function 72, as will be described below. For example, by patterning the results of the vibration detection performed when the pet P is known not to be experiencing motion sickness in a vehicle with the same or similar configuration to that illustrated in FIG. 1, a vibration pattern usable in the above-described determination can be accumulated in the database 75.

As a first example, the condition determination function 74 may correct the first vibration detection result obtained by the pet vibration detection function 71 based on the second vibration detection result obtained by the surrounding environment vibration detection function 72, and compare it with the vibration pattern accumulated in the database 75. In one example, the condition determination function 74 may synchronize the first vibration detection result and the second vibration detection result in time series, and then subtract the second vibration detection result from the first vibration detection result to extract the vibration of the pet P excluding the influence of the vibration in the surrounding environment. In that case, what is accumulated in the database 75 is a vibration pattern indicating the characteristics of vibration obtained by subtracting the vibration detection result of the surrounding environment from the vibration detection result of the pet P when the pet P is not experiencing motion sickness. When the corrected first vibration detection result deviates from the vibration pattern, the condition determination function 74 determines that the pet P is experiencing motion sickness.

As a second example, the condition determination function 74 may select a specific vibration pattern from multiple vibration patterns accumulated in the database 75 using the second vibration detection result obtained by the surrounding environment vibration detection function 72, and compare the selected vibration pattern with the first vibration detection result obtained by the pet vibration detection function 71. In that case, the vibration patterns accumulated in the database 75 include first vibration patterns indicating the characteristics of the vibration of the pet P when the pet P is not experiencing motion sickness (that is, corresponding to the first vibration detection result described above) and second vibration patterns indicating the characteristics of vibration in the surrounding environment detected at the same time (that is, corresponding to the second vibration detection result described above), which are associated with the first vibration patterns.

The condition determination function 74 first identifies a vibration pattern similar to the second vibration detection result obtained by the surrounding environment vibration detection function 72 from the accumulated second vibration patterns. The condition determination function 74 further compares the first vibration pattern associated with the identified second vibration pattern with the first vibration detection result obtained by the pet vibration detection function 71, and, when the first vibration detection result deviates from the vibration pattern, determines that the pet P is experiencing motion sickness.

In addition, in the present embodiment, the measured value of the thermometer 6 is input to the information processing apparatus 7, and the condition determination function 74 determines the condition of the pet P further based on the temperature in the surrounding environment of the pet P. In one example, multiple vibration patterns associated with a temperature range are accumulated in the database 75, and the condition determination function 74 compares a vibration pattern associated with a temperature range corresponding to the temperature obtained by the temperature obtaining function 73 with the first vibration detection result. The same is true for the case where the detection result of the illuminance and/or the $CO_2$ concentration in the compartment is obtained, and the condition determination function 74 compares a vibration pattern associated with an illuminance range and/or a $CO_2$ concentration range corresponding to the obtained detection result with the first vibration detection result.

As yet another example, the condition determination function 74 may obtain the time at which the vibration of the pet P is detected or the time at a time point at which processing is performed, and compare a vibration pattern associated with a time period corresponding to the time with the first vibration detection result. Note that the configuration of determining the condition of the pet P based on a detection result other than the vibration detection result is not required, and the condition of the pet P may be determined based on the vibration detection result alone.

Figure 3:
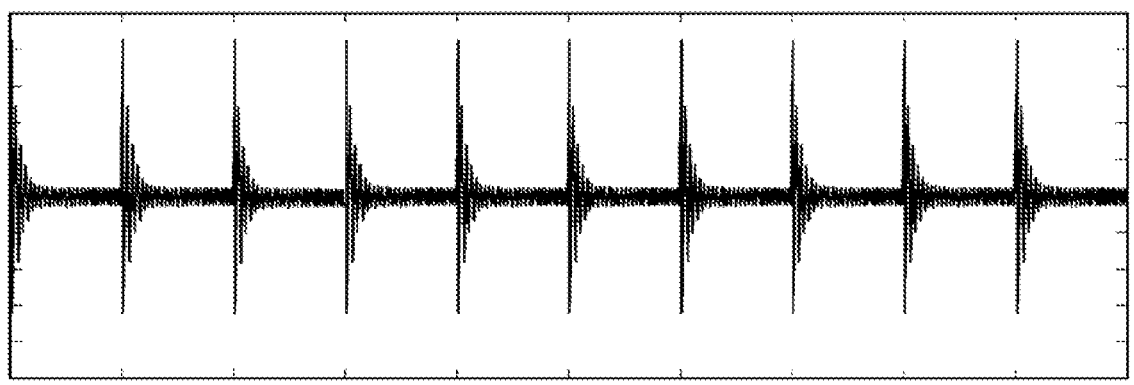
FIG. 3 is a diagram for conceptually illustrating the comparison of a vibration detection result and a vibration pattern.

FIGS. 3 to 9 are diagrams for conceptually illustrating the comparison of a vibration detection result and a vibration pattern. In each of the diagrams, a vibration pattern or a vibration detection result is illustrated as a graph of a time-series vibration waveform. FIG. 3 illustrates a vibration pattern to be compared, indicating the characteristics of vibration during normal times, that is, when the pet P is not experiencing motion sickness. In the illustrated example, a vibration pattern is recorded as a vibration waveform of a certain time length, and is compared, for example, with the vibration waveform of a vibration detection result of the same length. In another example, a vibration pattern may be recorded as a parameter of the amplitude, attenuation ratio, frequency, duration, and time interval of the vibration as described below, and, for example, the amplitude, attenuation ratio, frequency, duration, and time interval identified by analyzing the waveform of a vibration detection result of a certain time length may be compared with the parameter of the vibration pattern.

Figure 4:
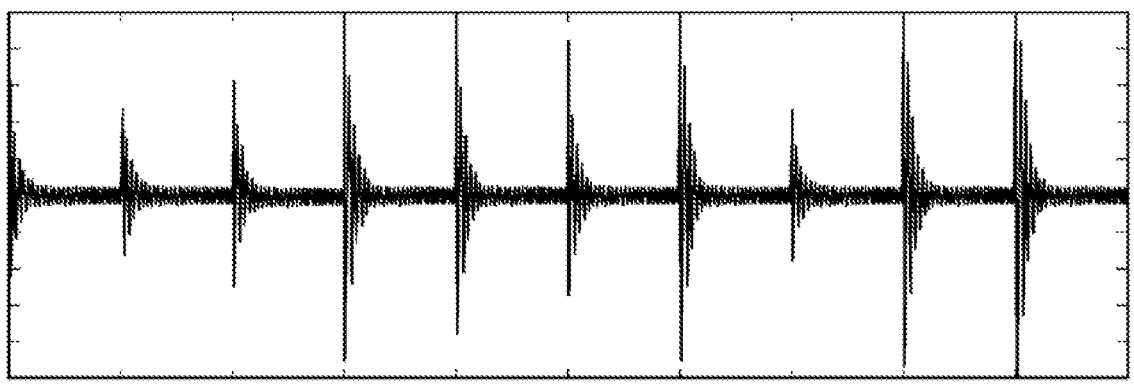
FIG. 4 is a diagram for conceptually illustrating the comparison of a vibration detection result and a vibration pattern.
Figure 5:
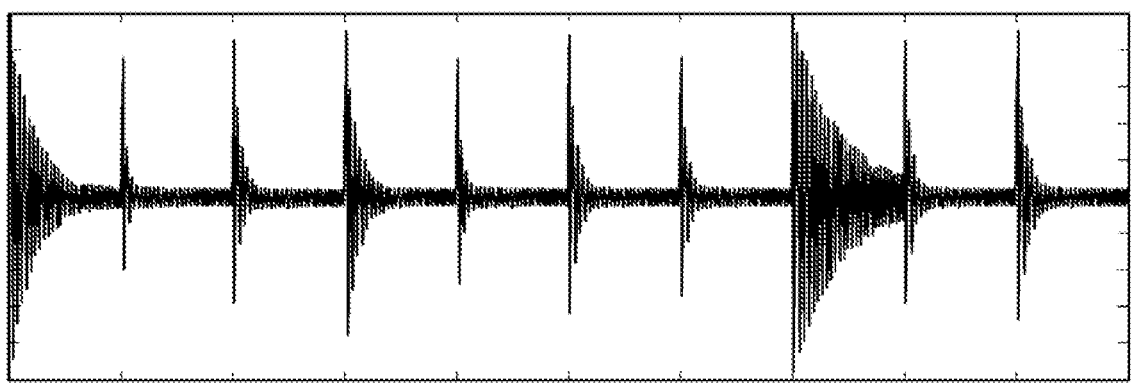
FIG. 5 is a diagram for conceptually illustrating the comparison of a vibration detection result and a vibration pattern.
Figure 6:
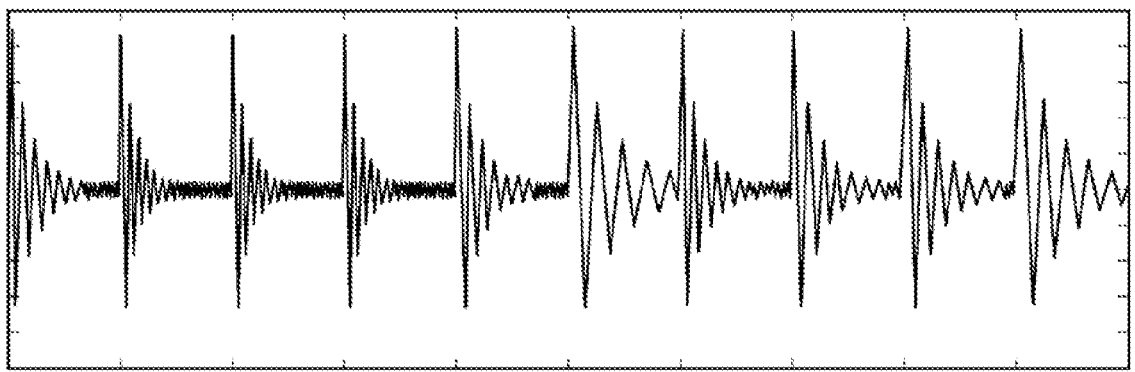
FIG. 6 is a diagram for conceptually illustrating the comparison of a vibration detection result and a vibration pattern.
Figure 7:
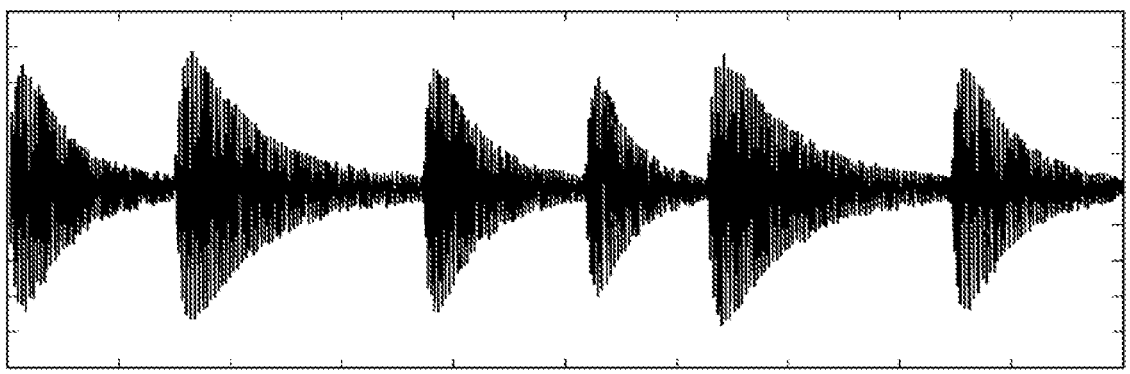
FIG. 7 is a diagram for conceptually illustrating the comparison of a vibration detection result and a vibration pattern.
Figure 8:
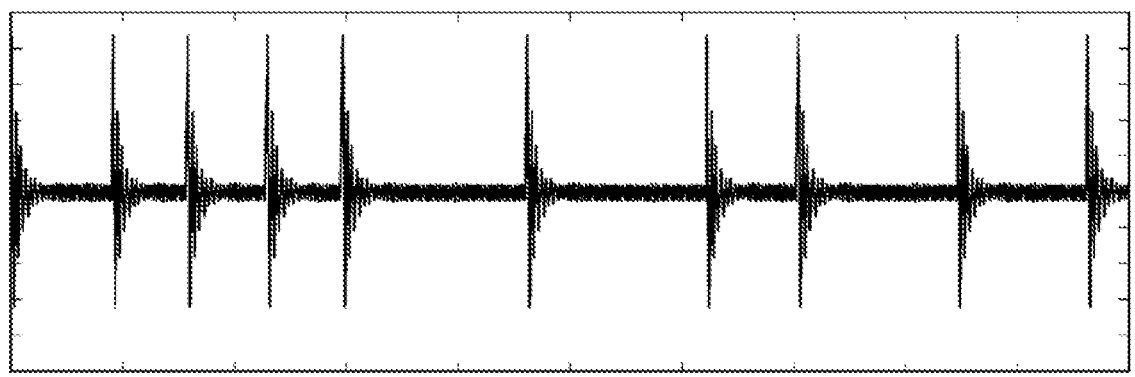
FIG. 8 is a diagram for conceptually illustrating the comparison of a vibration detection result and a vibration pattern.
Figure 9:
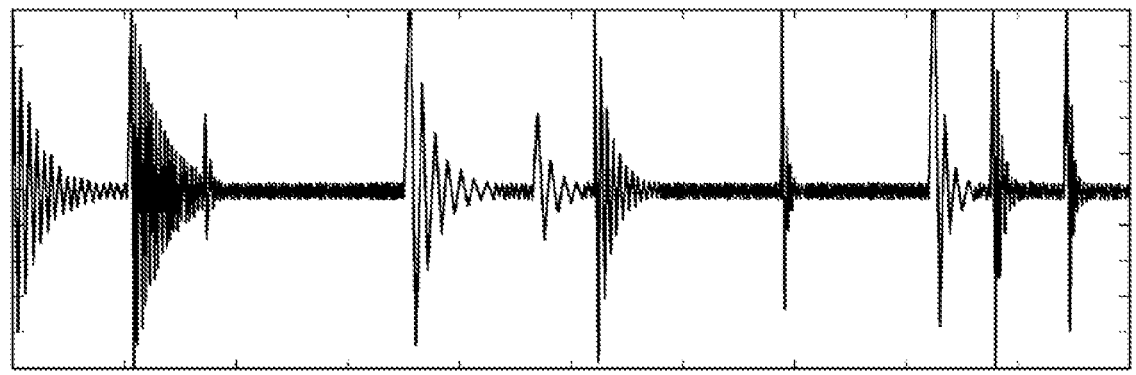
FIG. 9 is a diagram for conceptually illustrating the comparison of a vibration detection result and a vibration pattern.

FIGS. 4 to 9 illustrate examples in which a vibration detection result deviates from a vibration pattern. In the example of FIG. 4, the amplitude of a vibration detection result is different from the amplitude of a vibration pattern. In the example of FIG. 5, the attenuation ratio of the vibration of a vibration detection result is different from the attenuation ratio of a vibration pattern. In the example of FIG. 6, the frequency of the vibration of a vibration detection result is different from the frequency of a vibration pattern. In the example of FIG. 7, the duration of the vibration of a vibration detection result is different from the duration of a vibration pattern. In the example of FIG. 8, the time interval of the vibration of a vibration detection result is different from the time interval of a vibration pattern. In the example of FIG. 9, a vibration detection result is compositely different from a vibration pattern in terms of amplitude, attenuation ratio, frequency, duration, and time interval. For example, when such a waveform appears in the vibration detection result, the vibration detection result deviates from the vibration pattern, and thus the condition determination function 74 determines that the pet P is experiencing motion sickness.

Referring again to FIG. 2, the information presentation function 76 presents information for improving the condition of the pet P when the condition determination function 74 determines that the pet P is experiencing motion sickness. In one example, the information presentation function 76 presents information to the driver or occupant via the speaker 8, such as information indicating a driving method for reducing shaking or information prompting the driver or occupant to adjust the temperature in the compartment or to ventilate the compartment. The speaker 8 is an example of an information presentation device configured to present information for improving the condition of the pet P. In another example, instead of or along with the speaker 8, information may be presented through image display using a heads-up display or the like.

The information presentation function 76 may also present information based on the temperature obtained by the temperature obtaining function 73. In one example, the information presentation function 76 may present information prompting the driver or occupant to adjust the temperature if the pet P is determined to be experiencing motion sickness and the temperature in the compartment is not within an appropriate temperature range. Similarly, the information presentation function 76 may present information based on the detection result of the illuminance or the $CO_2$ concentration in the compartment. The temperature, illuminance, and $CO_2$ concentration in the compartment may be detected for presenting information by the information presentation function 76, even if they are not used for a determination made by the condition determination function 74, for example.

3. Example of Flow of Process

FIG. 10 is a flowchart illustrating an example of a process according to the embodiment of the disclosure. In the present embodiment, the detection of vibration by the accelerometers 4 and 5 and the sensing of the temperature in the cabin by the thermometer 6 are continuously executed while the vehicle 1 is driving (step S101). In the illustrated example, the condition determination function 74 of the information processing apparatus 7 does not execute the process until a certain time has elapsed from the start of driving of the vehicle 1 (step S102). This is because it is possible that the pet P will not get motion sickness for a while after the start of driving, even in an environment where the pet P more easily experiences motion sickness. In another example, the determination in step S102 may not necessarily be performed.

When a certain time has elapsed from the start of driving of the vehicle 1, in the information processing apparatus 7, the condition determination function 74 compares the vibrations detected by the pet vibration detection function 71 and the surrounding environment vibration detection function 72 (the first and second vibration detection results) with a vibration pattern accumulated in the database 75 (step S103). In one example, as described above, the condition determination function 74 compares the first vibration detection result with the vibration pattern while using the second vibration detection result as well.

If the condition determination function 74 determines that the pet P is experiencing motion sickness (YES in step S104), the information presentation function 76 presents information for improving the condition of the pet P to the driver or the occupant (step S105). The steps described above are repeated until the process ends, for example, due to the end of driving of the vehicle 1 (step S106).

According to the embodiment of the disclosure as described thus far, the motion sickness of a pet, which is a non-human animal, can be more accurately determined by accumulating in advance a vibration pattern when the pet is not experiencing motion sickness in a database, and comparing a newly detected vibration of the pet with the accumulated vibration pattern. By taking into consideration the surrounding environment of the pet, which is, for example, vibration in the compartment, a more accurate determination can be made. Furthermore, the accuracy of the determination can be further improved by selecting a vibration pattern to compare based on the detection result or time of temperature, illuminance, or $CO_2$ concentration in the compartment.

In other embodiments of the disclosure, non-human animals in the vehicle are not limited to pets, and may be, for example, livestock being transported. In such cases, the surrounding environment of the animals is not limited to the seats in the compartment, and may be, for example, the cargo bed outside the compartment. Even in the case where livestock are loaded on the cargo bed, if the livestock are experiencing motion sickness, they can be transported while preventing their motion sickness by using a driving method for reducing shaking according to the information presented, or by stopping the vehicle to allow them to rest.

While the preferred embodiment of the disclosure has been described in detail above with reference to the accompanying drawings, the disclosure is not limited to such examples. It is clear for those who have ordinary knowledge in the art to which the disclosure pertains to be able to conceive of various changes or modifications within the scope of the technical ideas described in the claims, and it is understood that these also naturally fall within the technical scope of the disclosure.

The information processing apparatus 7 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the information processing apparatus 7 including the pet vibration detection function 71, the surrounding environment vibration detection function 72, the temperature obtaining function 73, the condition determination function 74, and the information presentation function 76. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An information processing apparatus configured to determine a condition of an animal that is other than a human and moving on a mobile body, the information processing apparatus comprising:
   one or more processors and one or more memories communicatively coupled to the one or more processors,
   the one or more processors being configured to execute
      obtaining a first vibration detection result indicating vibration of the animal and a second vibration detection result indicating vibration in a surrounding environment of the animal, and
      determining the condition of the animal based on the first vibration detection result, the second vibration detection result, and a vibration pattern that is accumulated in a database.

2. The information processing apparatus according to claim 1, wherein in the determining of the condition of the animal, the one or more processors is configured to compare the first vibration detection result with the vibration pattern, and, when the first vibration detection result deviates from the vibration pattern, determine that the condition of the animal is a condition to be improved.

3. The information processing apparatus according to claim 1, wherein:
   the one or more processors are configured to further execute obtaining (i) a time, or (ii) a detection result of a temperature, an illuminance or a $CO_2$ concentration in the surrounding environment;
   the vibration pattern is associated with a temperature range, an illuminance range, a $CO_2$ concentration range, or a time period; and
   in the determining of the condition of the animal, the one or more processors is configured to determine the condition of the animal based on the first detection result, the second vibration detection result, and the vibration pattern associated with the temperature range corresponding to the temperature, the illuminance range corresponding to the illuminance, the $CO_2$ concentration range corresponding to the $CO_2$ concentration, or the time period corresponding to the time.

4. The information processing apparatus according to claim 1, wherein the one or more processors are configured to further execute presenting information for improving the condition.

5. A vehicle comprising:
   a first sensor configured to perform first detection of vibration of an animal that is other than a human and moving on a mobile body;
   a second sensor configured to perform second detection of vibration in a surrounding environment of the animal; and
   an information presentation device configured to present information for improving a condition of the animal in accordance with the condition determined based on a result of the first detection by the first sensor, a result of the second detection by the second sensor, and a vibration pattern that is accumulated in a database.

* * * * *